(12) United States Patent
Aegerter

(10) Patent No.: US 7,021,889 B2
(45) Date of Patent: Apr. 4, 2006

(54) GAS-JET DRIVEN ROTARY DEVICE FOR GENERATING A FIELD AND A PROCESS FOR TREATING ITEMS WITHIN THE FIELD FOR INCREASED PERFORMANCE

(75) Inventor: Karl Martin Aegerter, Rancho Cucamonga, CA (US)

(73) Assignee: Jimmette L. England, Rancho Cucamonga, CA (US)

( * ) Notice: Subject to any disclaimer, the term of this patent is extended or adjusted under 35 U.S.C. 154(b) by 109 days.

(21) Appl. No.: 10/810,947

(22) Filed: Mar. 26, 2004

(65) Prior Publication Data

US 2004/0191055 A1 Sep. 30, 2004

Related U.S. Application Data

(60) Provisional application No. 60/458,102, filed on Mar. 28, 2003.

(51) Int. Cl.
*F01D 1/18* (2006.01)

(52) U.S. Cl. .......................... 415/1; 415/80; 415/211.2

(58) Field of Classification Search .................. 415/80, 415/208.1, 211.2, 1
See application file for complete search history.

(56) References Cited

U.S. PATENT DOCUMENTS

| 2,569,997 | A | * | 10/1951 | Kollsman | ..................... 60/698 |
| 3,026,088 | A | * | 3/1962 | Green | ......................... 415/91 |
| 4,171,618 | A | | 10/1979 | Aegerter | |

FOREIGN PATENT DOCUMENTS

WO          WO 7900969 A1  *  11/1979

* cited by examiner

*Primary Examiner*—Ninh H. Nguyen
(74) *Attorney, Agent, or Firm*—Stetina Brunda Garred & Brucker

(57) ABSTRACT

A gas-jet driven rotary device is provided which, when being operated, creates a field which may be utilized to treat a variety of electrical, chemical, and mechanical systems, device and/or components for increased performance gains. The device includes a wheel-like rotor mounted between parallel walls defining part of a housing capable of being hermetically sealed such that a vacuum may be formed within the housing. One feature of the rotor is the structure forming the arcuate segment of the passageway around the shaft, which includes a flexible inner tube centered concentrically within a rigid outer tube or conduit of larger diameter. The annular space between the inner and outer tubes is in communication with the atmosphere. To power the rotary device, compressed gas is fed to it through the inlet opening into the passageway. The gas flows through the passageway and out the exit port in the form of a jet which imparts thrust to the rotor and causes it to spin.

29 Claims, 4 Drawing Sheets

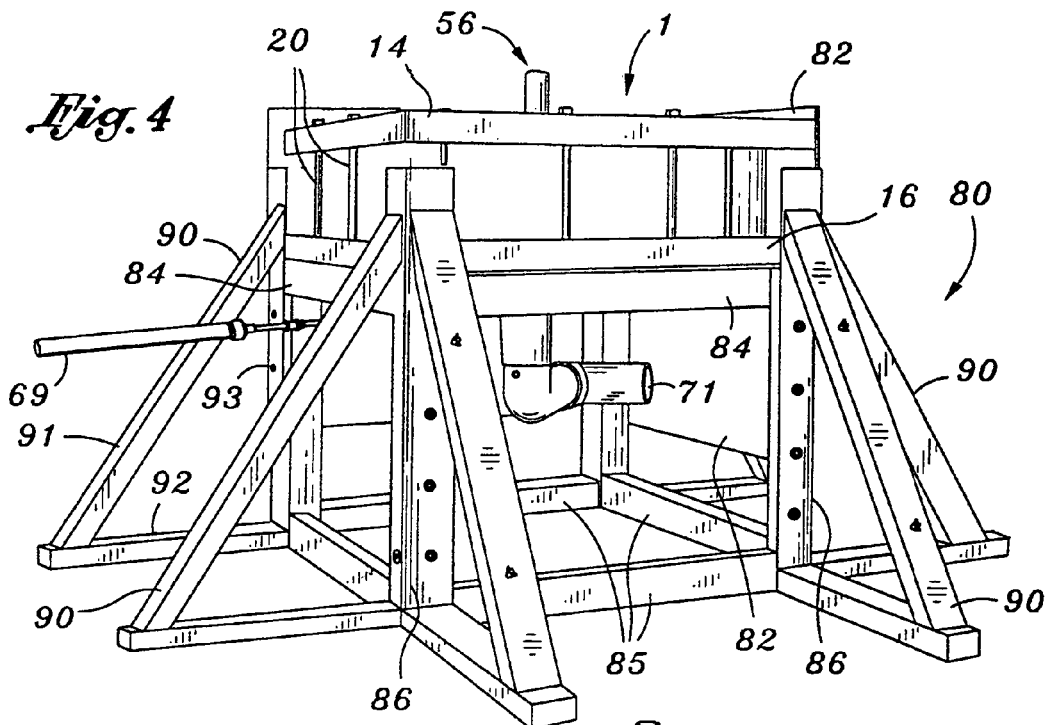
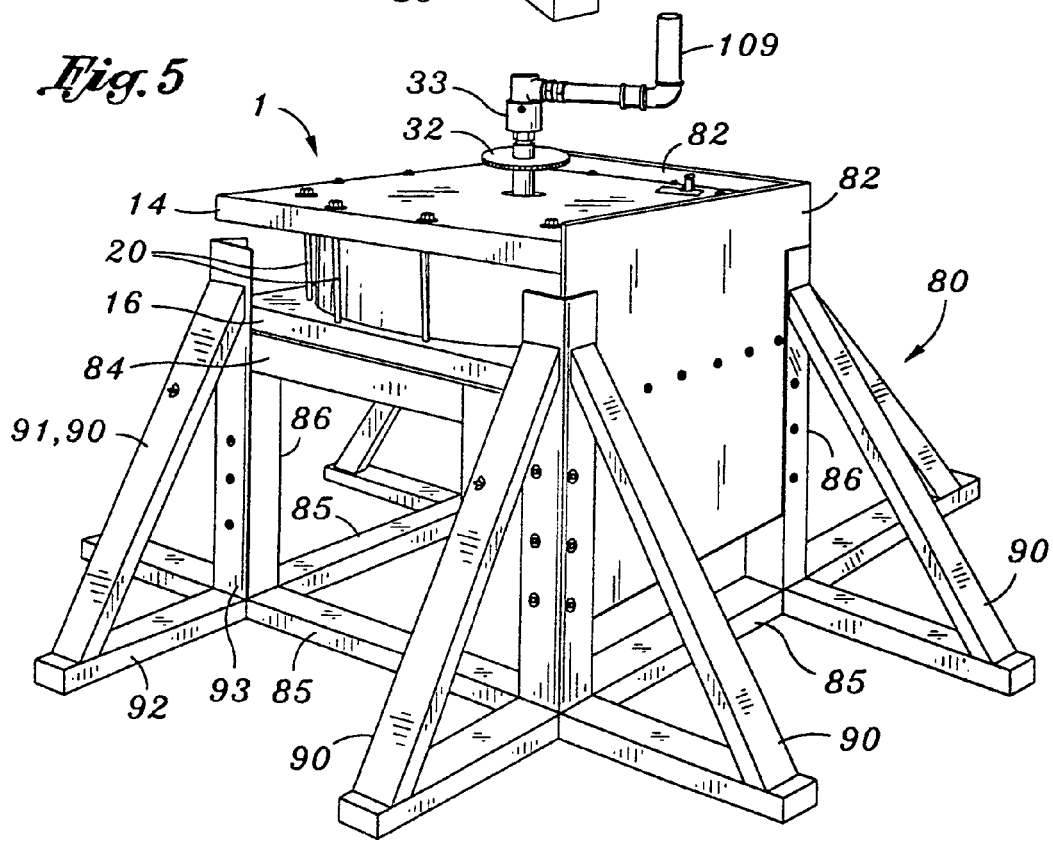

GAS-JET DRIVEN ROTARY DEVICE FOR GENERATING A FIELD AND A PROCESS FOR TREATING ITEMS WITHIN THE FIELD FOR INCREASED PERFORMANCE

CROSS-REFERENCE TO RELATED APPLICATIONS

The present application claims the benefit of Provisional Application No. 60/458,102 under 35 U.S.C. § 119(e) to K. Aegerter, filed on Mar. 28, 2003, the disclosure of which is expressly incorporated herein in its entirety.

STATEMENT RE: FEDERALLY SPONSORED RESEARCH/DEVELOPMENT

Not Applicable

BACKGROUND OF THE INVENTION

1. Field of the Invention

The present invention relates to devices utilized for generating electromagnetic, energy, and quantum fields or the like. In particular, the present invention relates to a gas-jet driven rotary device which, when being operated, creates a field which may be utilized to treat a variety of electrical, chemical, and mechanical systems, components and/or devices for increased performance gains.

2. Background of the Invention

Fields are a cornerstone of both traditional physics and the less understood quantum physics. The study of the origin of the electromagnetic fields that surround the earth has long been a subject of interest among the scientific community. Understanding the source of energy which generates the earth's electromagnetic fields or aurora of energy is beneficial knowledge which may be utilized to discover and or/study alternative forms of energy sources.

Currently, there are abundant theories that explain the presence of electromagnetic and/or energy fields about the earth. One theory is that the earth acts as a self-exciting dynamo that has maintained an electromagnetic field for roughly 40,000 years. A dynamo produces electric current by moving a conductor in a magnetic field and vice versa (i.e., an electric current in a conductor produces a magnetic field). If a dynamo is generating the Earth's electromagnetic fields, then two basic components are required: a conductor and motion. Whether or not a dynamo is generating the Earth's electromagnetic fields, many attribute the earth's rotational movement (or motion) as at least a contributing factor to the creation of fields about the earth.

It is therefore useful to understand the earth's rotational motion in an attempt to understand whether or not the earth's motion correlates to or contributes to the generation of energy fields. Not only does the earth rotate about the axis defined by the North and South Poles, but also the earth's axis of rotation experiences precession, nutation, and wobble. In basic terms, the earth's precession is a periodic movement of the earth's axis of rotation around a central point fixed in space. Moreover, the precession of the equinox is related to the fact that the Earth's axis of spin is tilted with respect to its orbital plane around the Sun, and with respect to the Moon's orbital plane, which is a forced precession with a period of about 25,800 years. Nutation is considered a "nodding" of the spin axis which superimposes a small nodding motion with a period of 18.6 years and an amplitude of 9.2 seconds of arc. Wobble is the periodic motion of the instantaneous polar axis. It is known that the Earth's axis of spin is not perfectly aligned with its polar axis of symmetry, so it "wobbles". For instance, the earth's tilt varies from about 22 degrees to a maximum of about 24.2 degrees.

It would be advantageous to provide a device or test apparatus which is designed to mimic at least an aspect of the earth's motion in a mechanical environment in an attempt to create an electromagnetic, energy, or quantum field or the like. If such an apparatus can be built which generates a field, the energy from the field quite possibly may be harnessed and utilized for at least scientific purposes and even possibly as an alternative form of energy.

Albeit, the spinning about an axis is easily physically modeled, the modeling of precession, nutation and wobbling is more challenging. In one model approach, since precession and nutation are long-term effects to the rotational movement of the earth, they are assumed to have a negligible impact, and thus, are not included in the model parameters (and thus limited to zero). It would be beneficial to provide a device or apparatus which provides rotation about an axis and of which at least mimics or simulates the wobble of the earth. With such an apparatus, the effects of wobble about an axis and its impact or contributions to the generation of an electromagnetic, or energy field may be further studied.

Furthermore, other theorists surmise that the electromagnetic energy or field of energy about the earth is better explained in terms of quantum mechanics, quantum electrodynamics and quantum field theory. Therefore, it would also be advantageous to provide an apparatus which models at least some aspects of the earth's movement, in particular rotation and wobble, for generating the aforementioned fields which may lead to studies that potentially better explain the generation of fields with respect to quantum theories.

Moreover, it would be advantageous to provide a device or apparatus which creates a field which may be utilized to treat a variety of electrical, chemical, and mechanical systems for increasing performance in a variety of ways.

BRIEF SUMMARY OF THE INVENTION

A gas-jet driven rotary device is provided which produces a field about the device. An exemplary embodiment of the present invention includes a wheel-like rotor mounted between parallel walls defining part of a housing capable of being hermetically sealed such that a vacuum may be formed within the housing. The rotor has a central shaft and a passageway extending therethrough with six bends. The passageway runs from an inlet opening in one end of the shaft to a first bend, then extends radially outwardly from the shaft to a second bend, then around an arcuate segment partially encircling the shaft, then back to the shaft, through the shaft and out of it at the end opposite the inlet opening. The passageway then runs radially outwardly, relative to the shaft axis, and, finally, through a bend to an exit port. One feature of the rotor is the structure forming the arcuate segment of the passageway around the shaft, which includes a flexible inner tube, made of PVC or the like (preferably with a tight fitting insert of reinforcing wire in the form of a spiral to give the tube a convoluted appearance). This flexible inner tube is centered concentrically within a rigid outer tube or conduit of larger diameter. The annular space between the inner and outer tubes is in communication with the atmosphere.

To power the motor, compressed gas is fed to it through the inlet opening into the passageway. The gas flows through the passageway and out the exit port in the form of a jet which imparts thrust to the rotor and causes it to spin. The rotor structure includes, in addition to that defining the aforesaid passageway, a metal band snugly encircling the perimeter of the tubular arcuate segment of the rotor, to vary the mass density of the rotor proportional to its radius.

The present invention is capable of generating a field which is created around the rotary device when it is under operation. The device generates a field with a radius of approximately 100 feet, although the radius may be widely variable depending on device size. Within this radius, many systems and devices are affected with a gain in efficiency attributable to the field.

One aspect of the present invention is that the field that is generated about the gas-jet driven rotary device has been shown to positively impact a variety of mechanical, electrical and chemical systems, devices or components. The impact of the field is illustrated through numerous experiments which are discussed thoroughly in the Detailed Description Section. Therefore, one aspect of the present invention includes a process for potentially improving efficiencies of a variety of mechanical, electrical and chemical systems, devices or components. Overall, the process simply entails exposing a component, device, and/or system within the field generated by the gas-jet driven rotary device. Although, positive effects are in no way a guaranteed outcome, thorough scientific testing does indicate some systems, devices and/or components have been affected such that efficiency gains have been realized.

For example, laboratory testing indicates that exposure to the field has increased the efficiency of electrical systems. Since simply placing a electrical component, device and/or system in the field next to the gas-jet driven rotary device is a non-complex process, it may be utilized as a cost-effective supplemental step in electrical product manufacturing processes. Processing does not require products or tools to be redesigned, although it may be the case that certain products and manufacturing processes may be optimized for performance efficiency gain by mere exposure to the field generated by the rotary device. The process may be applied at any point in the manufacturing process, from raw materials preceding manufacture, to finished products packaged for shipment. The rotary device is used to apply the process to manufactured products one time with lasting results, but the rotary device itself is indefinitely reusable but for typical maintenance.

Testing has indicated that the effect of the process on both material samples alone and on complete systems have all exhibited the following properties: (1) the effects become evident after only one exposure; (2) the effects are repeatable and predictable; (3) the effects are apparently permanent, requiring no ongoing maintenance; (4) and the effects occur without any negative effect to the environment.

Furthermore, some of the observed system-level effects of the technology include: (1) increased efficiency of batteries by more than 20 percent; (2) increased work load of a generator within an electrical system by more than 70 percent; and (3) increased distance traveled by a golf cart by more than 33 percent relative to pre-exposure performance.

The technology has a broad range of practical applications including electric motors and generators, including generators for the commercial distribution of electricity, and may also include gasoline and other motors utilizing power sources other than electricity as well as battery and fuel cell devices. Industries utilizing the technology are likely to include electric motors and electricity generator manufacturing, consumer and commercial battery and fuel cell manufacturing, communications, computing and consumer electronics manufacturers, among others.

For some products, the process will mean better performance and lower user costs resulting in increased sales. For other products, the process will mean a better product bearing a higher price.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which:

FIG. 4 is a side perspective view of the gas-jet driven rotary device integrated into a housing and support stand, according to an aspect of the present invention;

FIG. 5 is another side perspective view of the gas-jet driven rotary device integrated into the housing and support stand, according to an aspect of the present invention.

DETAILED DESCRIPTION OF THE INVENTION

Figure 1:
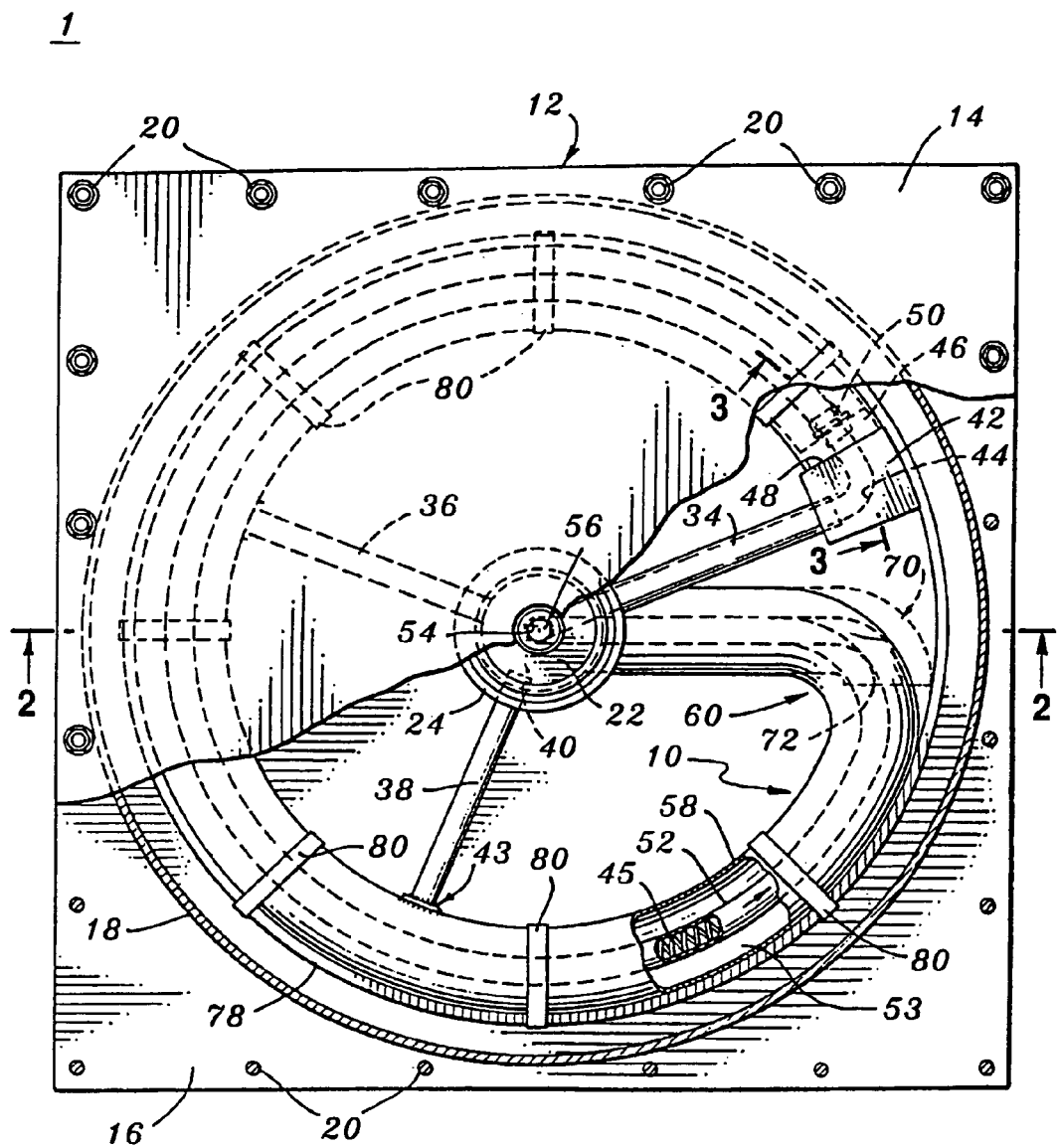
FIG. 1 is a top view of an exemplary embodiment of a gas-jet driven rotary device according to an aspect of the present invention, which illustrates a wall forming part of a housing of the device being shown partially broken away and a portion of the rotor assembly behind that part of the wall not broken away being shown in dashed lines.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. While the present invention can take more than one form, there is shown in the drawing and described in detail herein a preferred embodiment thereof. It should be understood that this disclosure is not intended to limit the scope of the invention to that particular embodiment.

Description of the Exemplary Embodiment of the Present Invention

Figures 2, 3:
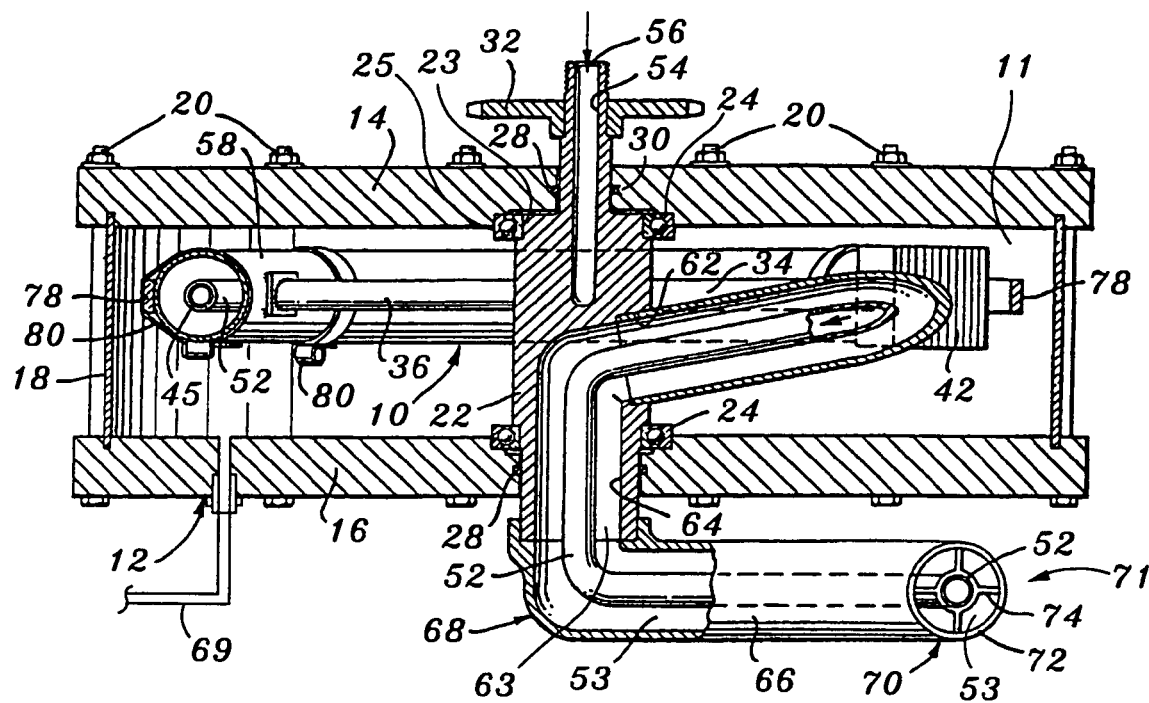
FIG. 2 is a view of the rotary device shown in section along line 2—2 of FIG. 1, according to an aspect of the present invention.
FIG. 3 is a fragmentary sectional view thereof, taken along line 3—3 of FIG. 1, according to an aspect of the present invention.

FIGS. 1 through 3 depict an exemplary embodiment of a gas-jet driven rotary device 1 according to an aspect of the present invention. The rotary device 1 is powered or driven by compress gas, such as air, which is exhausted from the rotary device to form a jet. A rotor 10 is substantially enclosed in a housing 12 formed by a pair of parallel walls, including upper wall 14 and lower wall 16 (preferably made of substantially thick aluminum plate) and a cylindrical wall 18 (preferably made of a relatively thin rolled steel plate as compared to the thickness of the walls 14, 16) positioned between the walls 14, 16 in cylindrical receiving grooves formed in the bottom side of upper wall 14 and top side of lower wall 16. The upper wall 14 and lower wall 16 are clamped tight against the cylindrical wall 18 by a plurality of nut and bolt fasteners 20, spaced around the outer perimeter edges of the upper wall 14 and lower wall 16, as best shown in FIGS. 1 and 2.

The housing 12 is hermetically sealed against gas leakage into or out of the housing 12. Additionally, a conduit path 69, such as piping, tubing, an&or flexhoses is provided directly into the chamber 11 formed by housing 12. The conduit path 69 is provided for one of either exhausting or pulling a vacuum in the chamber 11, or pressurizing the chamber 11. The vacuum can be created in the chamber 11 by any vacuum pump (not shown) known in the art, attached to the outlet end of the conduit path.

The rotor 10 includes a hub or shaft 22 (preferably made of stainless steel) rotatably mounted using ball bearings 24 assemblies press fit into bearing receiving grooves 25 having a diameter $D_w$ formed in the lower side of wall 14 and upper side of wall 16. Furthermore, the shaft 22 also has inner bearing receiving shoulders 23 having a diameter $D_s$ for receiving the ball bearings assemblies 24 with a slip fit. In the preferred embodiment of the present invention, the rotatably mounted shaft 22 is intentionally interfaced with the bearing assemblies 24 such that a wobble is induced when the shaft 22 rotates. The wobbling effect is induced by force fitting bearing assembly 24 into the receiving grooves 25 while simultaneously providing a slip fit for the shaft 22 to inner bearing receiving shoulders 23 interface. However, it is also acknowledged that the wobble effect may be introduced through other variants of the bearing assemblies fitment to receiving grooves 25 and receiving shoulders 23. For instance, the wobble may be induced by force fitting bearing assemblies 24 into receiving grooves 25 wherein the bearing assemblies 24 are manufactured such that sufficient play or looseness is formed within the bearing assembly 24 itself. In this case, the ball bearings may be undersized within the opposing races that maintain the ball bearings in the bearing assemblies 24. Additionally, O-rings seals 28, preferably made of TEFLON, are seated in receiving grooves 30 formed within wall 14 and 16 such that the receiving grooves 30 surround shaft 22. The O-rings 28 are inserted into the receiving grooves 30 such that the O-rings 28 are rotatably and slidably engaged with the shaft 22. In the exemplary embodiment, the upper end of shaft 22 has a drive sprocket 32 mounted thereon as illustrated in FIG. 2 (see also FIG. 5) to permit the rotary device 1 to be coupled to a load by use of a sprocket chain 104.

Three angularly spaced radially extending spoke elements 34, 36 and 38 are suitably secured in sockets 40 formed in the shaft 22. Spoke element 34 is tubular such that an inner passage or conduit is formed therein which is adapted to flow pressurized gas. Spoke element 34 furthermore interconnects to and supports a weighted inertial member 42. As best illustrated in FIGS. 1 and 3, the inertial member 42 has an elbow or curved inner passage 44 therethrough such that the conduit formed within spoke element 34 may be continued beyond the outer radial end of the spoke element 34.

A reduced segment 46 is formed around one end of the inertial member 42, beginning at an annular shoulder 48. The curved inner passage 44 terminates concentrically within the reduced segment 46 in a threaded socket 51 and a flanged nipple 50 is screwed into the threaded socket 51. A flexible tube 52, preferably made of PVC, is friction-fitted to the other end of the flanged nipple 50 in the manner best shown in FIG. 3. The shaft 22 has a vertically oriented passage 54, coaxially centered about the axis of the shaft 22, which creates an inlet passage to the hollow interior conduit with the spoke element 34, as best shown in FIG. 2. The vertically oriented passage 54 has an upper opening 56 which serves as an inlet port through which a compressed gas, e.g., air, can be fed to the rotary device 1 through a rotary coupling 33, best illustrated in FIG. 5, in which the gas is utilized to drive the rotary device 1.

A rigid, metal tubular conduit or jacket 58 having a circular cross section with an internal diameter approximately three times the diameter of the flexible tube 52 is hermetically fitted to the reduced segment 46 of inertial member 42 and extends in a concentric circular arc about the center axis of the shaft 22 forming within an inner annulus 53 formed by jacket 58. The jacket 58 is radially supported by the spoke elements 34, 36, and 38. Spoke elements 36, 38 are rigidly secured to the inner side of the jacket 58 at connections 43 and rigidly connected to the shaft 22 by being inserted into respective sockets 40 (see FIG. 1). The jacket 58 extends from its point of connection to the inertial member 42 for almost a full circle and then curves radially inwardly forming an elbow 60. In the exemplary embodiment of the present invention, the elbow preferably has a radius turn of about 7 inches. The conduit 58 is then directed towards an opening 62 in shaft 22 at a downward inclination where the inner annulus 53 communicates with a passage 64 forming a vertically oriented shaft annulus 63 leading to an opening in the lower end of the shaft 22 opposite the end with the opening 56. As FIG. 2 illustrates, this part of jacket 58 between the bend 60 and the opening 62 in shaft 22 slants downward to avoid interference with the lowest portion of passage 54 in the shaft 22.

Rigidly affixed to the lower end of shaft 22 and interconnected to the shaft annulus 63, and in hermetically-sealed relationship therewith, is a section 66 of rigid metal jacketed conduit with two 90-degree bends 68 and 70 therein. Bend 68 occurs at the end of section 66 adjacent the lower end of shaft 22 and bend 70 occurs near the opposite end of section 66 proximate the circular perimeter of the rotor 10 (see FIGS. 1 and 2). The section of conduit 66 is oriented such that it is normally oriented to and radially projects outward from the lower end of shaft 22. Furthermore, it is noted that the section 66 is aligned directly underneath the section of jacket 58 which is inwardly routed to shaft 22 after the elbow 60. The outboard end of conduit section 66, shown at 72 in FIGS. 1 and 2, is open to the atmosphere and faces in a clockwise direction relative to the orientation of jacket 58 and rotor 10 as seen in FIG. 1. For reasons which will soon become apparent, jacketed conduit section 66 will hereinafter be referred to as fulcrum thrust arm 66.

The flexible tube 52 is positioned concentrically within the passageway formed by the jacket 58, passage 64 in shaft 22, fulcrum thrust arm 66, and terminates at the opening at the outer end 72 of the thrust arm 66. The flexible tube 52 is supported in the concentric position by a plurality of suitable spacers 74, as shown in FIG. 2. Furthermore, the flexible tube 52 is open at its terminus to provide an exhaust port which forms a jet generated from compressed gas passing therethrough. A metal hoop or band 78 is fastened in position around the outer periphery of the circular part of metal conduit 58 of the rotor 10 by a plurality of hose clamps 80. The metal hoop 78 is preferably made of strap iron and serves to add inertial mass to the rotor 10.

The flexible tube 52 is preferably of a commercially available type having a wire spiral running counterclockwise around its inner wall in the direction of flow of the compressed gas through the rotor 10. The wire spiral in flexible tube 52 serves as tight fitting reinforcement for its wall and, because of its tight fit, gives the wall a convoluted appearance. The wire spiral in the flexible tube 52 is best illustrated in FIG. 3.

FIGS. 4 and 5 are provided to illustrate an exemplary structural support stand 80 of which the rotary device 1 may be positioned within and integrated thereto. The stand 80 includes four vertical legs 86, which are structurally interbraced together by four horizontally oriented bottom wall support beams 84 and four horizontally oriented floor support beams 85. As previously stated, one aspect of the rotary device 1 is to intentionally produce a controlled and tunable wobble about the shaft 22 when the rotor 10 is spinning. Such wobble will create unstable movement in the rotary device 1 while it is being operated (similar to that of an unbalanced washing machine). To provide additional stability while the rotary device 1 is under operation, a plurality of inclined strut brace assemblies 90 (eight in the exemplary embodiment shown in FIGS. 4–5), are fastened to the vertical legs 86 with fastening hardware such as conventional nut and bolts. Each inclined strut brace assembly 90 includes an inclined strut 91, a horizontal floor strut 92, and a vertical mounting plate 93. It is further noted that each inclined strut brace assembly 90 may be anchored to the floor to prevent the rotary device 1 from moving on the floor when the rotary device 1 is being operated.

It is further noted that a pair of sidewall panels 82 are attached to two contiguous sides of the rotary device 1 and the support stand to form a partial enclosure. Preferably, the sidewall panels 82 are made from relatively thin, as compared to the thickness of upper and lower walls 14, 16. One reason for providing the pair of contiguous sidewall panels 82 is for tuning the wobble of the rotor 10 to produce the field. In particular, when the rotary device 1 is being operated and the rotor 10 is spinning, the thrust from the jet projected out of the exhaust port 71 will ricochet off the two sidewalls 82. This ricochet effect further contributes to the tuning of the wobble. Thus, the place of the two vertical walls contiguous to each other is a factor which is considered a tuning parameter which helps to induce the creation of the field.

Operating and Functionality of the Present Invention

To operate the exemplary embodiment of the jet driven rotary device 1, compressed air from a suitable source can be fed into opening 56 through a piping of a hose 109 connected by a rotary coupling 33 (shown in FIG. 6) such as mentioned above. The compressed air flows through the continuous passageway through rotor 10 described above and exits the exhaust port 71 at the outer end of fulcrum thrust arm 66. As the gas exhausts through the exhaust port 71, a jet is formed which creates thrust which causes the rotor 10 to spin in a counterclockwise direction. As the rotor 10 is driven counterclockwise, the kinetic energy imparted to the rotor 10 can be utilized to do work when a load is connected to the rotary device 1 through a sprocket chain 104 driven by sprocket 32 (see FIG. 6).

Testing of the rotary device 1 indicates that the creation of the field is at least a function of a harmonic vibration which is created as a result of the rotational speed of the rotor 10, the wobble induced from the bearing fitment, and the positioning of the sidewalls 82 of the encasing 90. When the device 1 is being operated, a vibration at an audible harmonic frequency which occurs at about 600 RPM, produces the best results. That is to say, the field has been repeatedly produced under these circumstances. Thus, for the best results, that is to say to generate the field, the rotary device 1 is operated around 600 RPM. Additionally, testing has indicated that the field is generated by tuning the wobble of the rotary device 1. As previously discussed, one aspect of the present invention is that it may be intentionally configured to have an induced wobble when the rotor 10 and shaft 22 spin. Preferably the wobble is tuned through the fitment of the bearings assemblies 24 and the bearing receiving inner and outer bearing shoulders 23, 25, respectively. Additionally, the wobble is tuned through the configuration/design of the rotor 10. For instance, although it has not been mentioned heretofore, it should be pointed out that for best results, the rotor 10 (not including the fulcrum thrust arm 66) should be dynamically balanced prior to attachment of the fulcrum thrust arm 66 thereto. Thus, weighting and balancing the rotor 10 may contribute to the effectiveness of the present invention. Other features of the present invention which impact the wobble are positioning of the two sidewall panels 82. As mentioned above, the thrust from the jet projected out of the exhaust port 71 will ricochet off the two sidewalls 82 (see FIG. 5). Since the ricochet can cause the shaft to slightly move within the bearing races, the placement of the two vertical walls contiguous to each other is a factor which is considered a tuning parameter. Therefore, bearing fitment, rotor configuration and balancing, and structural features of the rotary device 1, such as the sidewalls 82, are all features which contribute the tuning of the wobble. Overall then, it is recognized that the aforementioned parameters may be varied to change the dynamic rotational characteristics of the rotor 10 to tune the wobble such that a harmonic frequency which creates the field may be identified.

Figure 6:
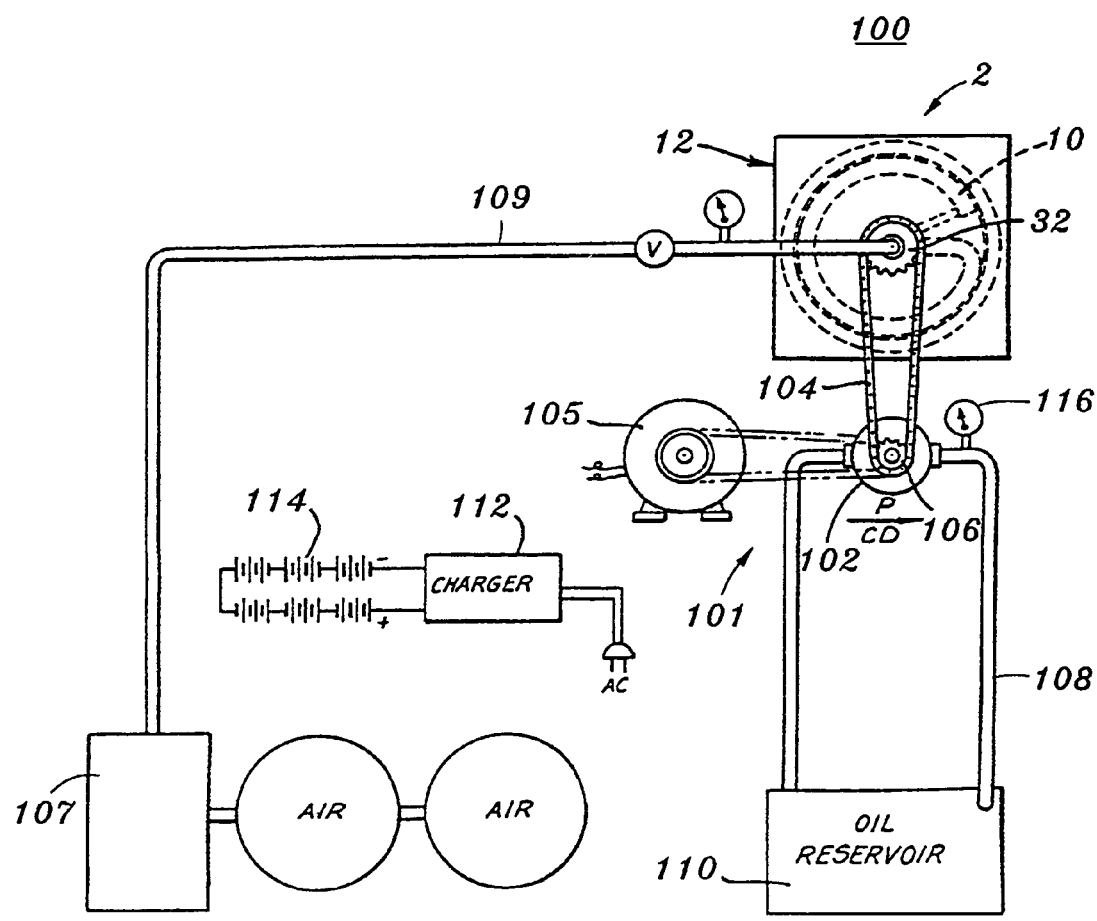
FIG. 6 is a schematic diagram of the rotary device coupled to a test apparatus which includes with a pump in a hydraulic loop system and an electric motor, as an alternative drive for the pump, as well as a charger for charging lead storage batteries and a bank of six such batteries connected to the charger, according to an aspect of the present invention.

Experiments Exemplifying the Effects of the Field Generated by the Present Invention For testing the efficiency of the rotary device 1 under a load, a test apparatus 100 may be provided which includes a closed-loop hydraulic system 101 schematically shown in FIG. 6. The hydraulic system 101 includes a variable speed constant displacement pump 102 (Sperry-Vickers model V-14420LE) with a pump sprocket 106 mechanically driven by a sprocket chain 104 which is driven by the drive sprocket 32 attached to the shaft 22 of the rotary device 1. When the pump 102 is being driven by the rotary device 1, the hydraulic fluid is circulated from the outlet of the pump 102 through closed-loop system piping 108 which leads to oil reservoir 110 and of which then returns back to the inlet of pump 102. The closed-loop system piping 108 is provided with instrumentation 116 to measure head and downstream pressures of the hydraulic fluid.

In the course of testing the rotary device 1 in conjunction with the closed-loop system 101, it has been discovered that a field is created around the rotary device 1 when it is operating under a work load and that the filed affects electrical systems, metal alloys, hydraulic fluids and other materials, devices, and systems when they are positioned within the field.

Experimentation with the rotary device 1 has led to conclusion that the housing, defined by upper wall 14, lower 16, and cylindrical wall 18 which encloses rotor 10, should be hermetically sealed during operation of the device 1. Although one would expect an evacuated housing to be conducive to greater operating efficiency, when the device 1 is oriented with its rotor 10 horizontally disposed, its performance is better when the housing contains air than when it is under vacuum. This was borne out by a comparison of test runs of the device 1 with its housing under one atmosphere of air pressure and similar runs with the housing evacuated. It was found that the rotor 10 reached 300 rpm 30% faster when the housing contains air than it does with the housing evacuated. Moreover, the results of other tests with the rotor 10 vertically disposed showed just the opposite to be true, that is, the device 1 works better with the housing evacuated than when it contains air.

What follows are examples illustrative of the effects of the rotary device 1 in operation and the results achieved thereby:

EXAMPLE I

The first example is included to illustrate the effect and/or impact of the field generated by the rotary device 1 on lead storage batteries 114 charged within the field proximate the rotary device 1 (see FIG. 6). The first example also analyzes the impact of the field on the battery charger 112 itself (see FIG. 6), and on the battery charging techniques utilized to charge the lead storage batteries 114.

FIG. 6 schematically shows the bank of six batteries at 114 connected to the battery charger 112. The six 6-volt lead storage batteries 114, suitable for use in a golf cart, were connected in series and placed about 18 feet from the rotary device 1. The six batteries 114 had been discharged until they were down to terminal voltage according to BCI standards. A 36-volt, 40-amp battery charger 112 was connected to the bank of batteries 114. Neither the batteries 114 nor the battery charger 112 were in any way connected to the rotary device 1 or any testing apparatuses. The rotary device 1 was then operated for approximately 15 minutes and thereafter shut down. The batteries 114 were then charged with the battery charger 112.

After the batteries 114 were charged within 18 feet of the operating rotary device 1, the batteries 14 were installed in a golf cart. Prior to the charging of the batteries 114, numerous test drives with the golf cart had shown that when the batteries 114 were fully charged in the traditional way, the golf cart would go 30 miles when driven at top speed until the batteries 114 were discharged. After the batteries 114 were charged following exposure to the field of the rotary device 1 for 15 minutes, as described above, and placed in the golf cart, the cart was found to go 42 miles when driven until the batteries ran down. These results were achieved repeatedly during the course of the testing program. Furthermore, six batteries 114 that had been charged under the influence of the field of the rotating device 1 in accordance with the above-described procedure, were stored for one year, then tested in the golf cart again. This time, without any repeat charging, the battery drove the car for 72 miles.

Not only the batteries 114, but the battery charger 112 used to charge the subject batteries 114, was influenced by its exposure to the field from the rotary device 1. In particular, when the charger 112 used to charge the six batteries 114 was used to charge exhausted lead storage batteries that had not been exposed to the field, the unexposed batteries were found to discharge about 33% more current than their traditionally charged counterparts could provide. Moreover, when the charger 112 was hooked up to a simple series circuit (in an attempt to find out why it behaved as it did under the influence of the field), the current going into this circuit was measured at 25 amps, but the current coming out of the circuit was at 29 amps.

Another effect due to the exposure to the energy field emitted from the rotary device 1 was observed when the charger 112 was plugged into an AC wall outlet and an oscilloscope was employed to compare the wave cycle coming out of the AC wall outlet into the charger 112 with the return cycle going back into the AC wall outlet. It was found that the return cycle was 3-phase and that there was 40% more current going back into the AC wall outlet than had come out. In another experiment, a resistance coil was connected to the charger 112 and submerged into one pound of water. The theoretical temperature elevation of the water from the amount of current going into the water was calculated and it was discovered that the temperature was raised 40% more than it should have been, based on the number of BTUs going into the water from the resistance coil (one BTU raises one pound of water 1° Fahrenheit per minute). This 40% increase over the theoretical is the average of numerous experiments.

Additionally, lead storage batteries 114 charged under the influence of the rotary device 1 in the above-described manner were subjected to extensive examination and testing by an independent test laboratory (HI-REL LABORATORIES, INC. of Monrovia, Calif.) with interesting results. For example, one of the "treated" batteries 114 and a new battery of the same type were each emptied of its fluid. Both batteries had been full to start with, and of the same internal volume, but the fluid drained from the "treated" battery 114 measured 1.645 liters less in volume than the fluid from the untreated battery. Before the electrolyte was removed from either battery, the treated battery 114 weight two pounds less than the untreated one, yet it weighed one pound more after the electrolyte was removed. The specific gravity of the electrolyte in the treated battery 114 was 1.320, which is high for an electrolyte. This high specific gravity could not be accounted for in terms of the elements found in the electrolyte when it was analyzed. Also, titanium was found in the treated battery 114. The reason for the presence of this titanium could not be explained by HI-REL LABORATORIES.

One consistent result that has been observed through numerous experiments with the treated batteries 114 is that approximately 33% more energy is produced by such a treated battery 114 than by its fully charged untreated counterpart. Moreover, charging time has been reduced 33% by the effects of the field from the rotary device 1 on the charging procedure.

EXAMPLE II

Another experiment entailed exposing an e/m apparatus to the field generated by the rotary device 1 for a period of about five minutes. After the e/m apparatus was exposed to the field, the e/m apparatus was delivered to The Alter Energy Group (TAEG) headquarters for evaluation. The following example entails three tests. Tests 1 and 2 were performed at the Alter Energy Group Headquarters. Test 3 was performed by the Department of Navy at the Alter Energy Group Headquarters. The tests are now herein described below:

An e/m apparatus generates a beam of electrons and accelerates them to a measurable velocity in a uniform magnetic field of measurable strength. The magnetic field is perpendicular to the path of the electrons, causing them to move in a circular path. From the radius of this path one can calculate e/m, the ratio of which is the charge on the electron to the mass of the electron. Overall, the test revealed that the treated PASCO e/m apparatus commonly produced results 50% above accepted values, and also gave varying results depending on certain parameters.

The e/m apparatus (a PASCO #SE-9638 unit was used in the testing) creates a beam of electrons and forces them into a circular path in a magnetic field, due to the interaction of the field and the negative charge on the electron. By measuring the radius of this circle, the velocity of the electrons and the strength of the magnetic field, one can calculate the charge to mass ratio, e/m, of the electron. This ratio is also known as the specific electron charge and is a constant.

To be able to fully understand, comprehend and appreciate the instant test, it is first helpful to understand the basic theory behind the PASCO e/m apparatus used in the series of tests. If an electron is moving in a magnetic field, the field exerts a force perpendicular to the electron's path. For the force of the field on the electron, we have:

$$F = evB \qquad (1)$$

where e is the charge on the electron, v its velocity, and B the strength of the magnetic field. Note that in this case, the direction of the field is perpendicular to the direction of the electron's velocity. If this were not the case, other factors would be introduced.

Objects moving in a circle have a centripetal force toward the center of the circle equal to:

$$F = mv^2/r \qquad (2)$$

where m is mass (of the electron, in this case), v the velocity again, and r the radius of the circle.

In this case the centripetal force is due to the magnetic field. Setting the two forces equal yields:

$$evB = mv^2/r \qquad (3)$$

Manipulating this equation we obtain the result:

$$e/m = v/Br \qquad (4)$$

The electrons have a kinetic energy of m $v^2/2$, which is also equal to their charge, e, times the accelerating voltage, V, so:

$$eV = mv^2/2 \qquad (5)$$

and therefore their velocity is:

$$v = (2eV/m)^{1/2} \qquad (6)$$

The strength of the magnetic field generated by the two Helmholtz coils is:

$$B = (N\mu_\circ I)_{/(a\ 1.25}{}^{3/2} \qquad (7)$$

where N is the number of turns on each coil, 130; $\mu_\circ$ the permeability constant, $4\pi E$-7 Henry/meter; I the current through the coils; and a the radius of the coils, 0.15 meters. This gives a final result of:

$$e/m = (2Va^2(1,25^3))/(N\mu_\circ Ir)^2. \qquad (8)$$

The accepted value for e is 1.6022E-19 Coulombs, and for m is 0.9110E-30 kilograms, which gives an accepted value for the ratio of e/m=1.7588E11 C/kg.

The e/m apparatus uses three separate electrical circuits to accomplish all this. The first generates the magnetic field by means of a set of Helmholtz coils, two rings 30 cm in diameter 15 cm apart, each holding 130 wraps of wire. The magnetic field produced in the central area between the coils is very uniform, and perpendicular to the coils themselves. This circuit uses its own power supply, (a PASCO SF-9584 Low Voltage Supply) and takes 6 to 9 volts DC, at no more than 2 Amps. The e/m device typically operates at 1.5 amps. A multimeter (Circuitmate DM15B #90912529) in the circuit measures amps, the only piece of data required from this circuit. Amps translate to magnetic field strength, as shown in Equation 7.

The second circuit accelerates the electrons with a voltage, V. This voltage, which can range from 150 to 300 volts DC, is applied to a cathode (+) and an anode (-) by a voltage supply (a PASCO SF-9585 High Voltage Supply was used in the test). Typically it is operated at 300 volts. The cathode and anode make up an electron gun. This gun is a small cylinder, about 1 cm in diameter and 3 cm long, mounted in the lower portion of a helium-filled bulb 13 cm in diameter, which is in turn mounted in the center of the Helmholtz coils. The electrons leave the cathode at one end of the cylinder and are attracted by the anode at the other, but most pass through a hole in the anode and travel on with a velocity shown in equation 6. A few of the electrons collide with an excite helium atoms, which then radiate a blue-green light, making the electron beam visible. When the magnetic field is off, their path is a straight line 4 cm long which ends at the bulb wall. As the strength of the magnetic field increases, the path is gradually bent upwards and over into a circle. A second multimeter (Circuitmate DM15B #90912534) used in this circuit measures the accelerating voltage.

The third circuit uses the AC supply portion of the voltage supply mentioned above. It uses 6 volts AC to heat the cathode, which allows it to emit electrons. Its operating levels do not enter into the equations at all. Lower voltage levels should merely produce fewer electrons, and a less intense beam. Higher levels will produce higher intensities, but will also burn out the filaments more quickly. The tube also has a life span due to the consumption of helium.

The upshot of all this is that all the experimenter must do is measure the accelerating voltage, current to the Helmholtz coils, and the radius of the circle; the remaining factors are constant. These four numbers are all that is required for the calculation of e/m using Equation 8.

An analogy can be made between the electron moving in the magnetic field and a weight on a long spring being swung in a circle. A weight of mass m on a spring of strength k swinging at a measured speed will move in a circle of a commensurate radius. If the experimenter measures the radius of the circle and the velocity of the weight, he can calculate the ratio of k/m, the spring constant to the mass of the weight. Since k/m is a constant unless the mass or the spring is changed, if the speed of the mass changes, the circle will change size to compensate, leaving k/m constant. In the same way, if the electrons change speed due to a change in accelerating voltage, the radius should change to keep e/m constant.

Changing the spring to a different strength is similar to changing the strength of the magnetic field by increasing current. Stronger springs make the mass move in a smaller circle, just as stronger magnetic fields make the electrons move in a smaller circle. If the force between the magnetic field and the charge on the electron becomes stronger, the circle gets smaller. If the electron moves faster, the circle gets larger. These changes should balance each other, leaving e/m constant.

Test 1 (Performed by the Alter Energy Group):

Measurements of the e/m apparatus were made almost every weekday, at least once a day. The voltages were measured with the two Circuitmate multimeters, and cross-checked with a Micronata 22-93 meter, which was also used to check their batteries and measure the cathode heater AC voltage.

For a reading, the amps to the coils were first measured, then accelerating voltage, then the location of the right side of the circle in centimeters, then the left side. The amps and volts again were then checked again. Voltage was always stable, but if amps are dropping, an average value of the two levels in calculations were used.

Initially, a circle was present that was slightly large for normal levels of 300 volts and 1.5 amps, resulting in a value for e/m that was too small by 5%. The circle started out with a radius of 5.1 cm and at standard levels should be 5.0 cm. This amount of error was considered acceptable. A new bulb (#4) was installed into the PASCO e/m apparatus. The bulb, heater, and circle were left on continuously for about three days, over which time the circle shrank (and e/m grew).

The circle eventually stabilized at a radius of 3.5 cm, which gives values for e/m approximately 50% high. Previous bulbs at these standard settings also changed size, including one that achieved a radius of 1.5 cm, yielding a value for e/m of $9 \times 10^{11}$ (about 80% high). Bulb #4 had not yet attained this size at standard levels of voltage and current, but it was discovered that one was able to force a comparable change in size by decreasing the voltage to the cathode heater. It is noted that only three fixed levels of low power AC were available. A cooler cathode should have only produced fewer electrons; this should have only made the beam less intense. It should have absolutely no effect on e/m, since the electrons that do come off will still be accelerated by the 300 volt potential and should still follow the usual path.

This led one to investigate the relationship between what could be controlled (accelerating voltage and coil current) and the size of the circle. It was then decided to see if these known factors had also been altered and if the above equation for e/m was still valid. To take this data, current was varied, while holding accelerating voltage and heater voltage at the standard values. This full set of information was taken on three occasions. The results were graphed. On some graphs, a series of calculated circle sizes were included, made by assuming e/m=1.759E11, the defined value, and working backwards through equation 8 to calculate r for each voltage or current level.

It is important to remember with respect to all graphs that were made, that e/m has a constant value; it should not change when any variables change. Rather, the radius of the circle should change to compensate for the change in voltage or current, keeping e/m constant. The graphs relating coil current to radius and e/m demonstrated this well; the three sets of radii varied with roughly the same shape as the theoretical set, but are all about 1.5 centimeters too small. This corresponded to a uniformly high set of figures for e/m, increasing slightly with amps. Apparently, the observed radii did not match the theoretical radius well after all; if they had, the e/m points would have lie along the same horizontal path. The graphs relating voltage to radius and e/m were significantly worse. Again, the shape was good, although low, but as voltage decreased, the two later runs suddenly jumped to a smaller radius. Experimentally, this jump looked discontinuous. As a certain voltage was passed, the circle popped down to a very small radius, about 1.5 cm, as mentioned above. The circle at this size was shifted to the right, well off center, because the electron gun is large and the circle centers itself over the right side of the gun, where the electrons are actually emitted. The circle popped back up to its old size 10 to 15 volts above the pop-down voltage.

The data graphed was all taken by decreasing voltage, so the discontinuity shown on the graphs was at the pop-down voltage.

The latest run was the worst of the two, implying that this pop may happen at higher voltages as time passes. The pop was clearly seen on a voltage vs. e/m graph, and the trend in e/m voltage decreased below the level of the pop. As noted earlier, the shape of the radius curves was good, for the previous set and for the others, pre-pop. After the pop, calculated e/m was bad and got worse. It was noted that the vertical scale was larger for the voltage set than for the current set; the previous e/m results were about as bad as the e/m vs. current results.

On a first graph, showing daily measurements of e/m at standard levels of voltage and current, test engineers were careful to include only standard levels for what were obvious reasons. If the voltage at which the circle popped to a smaller size and continued its trend, it would soon have been close to 300 volts and the graph would have changed radically.

The test engineer could not find any problem with the apparatus that might explain this behavior. The multimeters were accurate, the patchcords had nominal resistance and the coils had a resistance of only 6.6 ohms. A gaussmeter was used to directly measure the strength of the magnetic field created by the Helmholtz coils, and to get about 11.8 gauss, varying between 11.5 and 12 gauss. Calculations using Equation 7 yielded 11.69 gauss at 1.50 amps. This implied that the problem was not in the circuit that generates the magnetic field, but somewhere in the bulb. The only measurement able to be made of the bulb itself was the resistance through the cathode heater circuit (this measurement was made across pins labeled 1 and 12 on the base of the bulb), which was 4.7 ohms after one day of use. A measurement was later taken at 3.0 ohms. The filament was on the left side of the electron gun, and the electron circle looped around and hit it. Higher resistance may have been due to ionization from the electrons, or merely from the amount of use it had seen. A drop in resistance would have meant less heat, but as noted above, that should only meant a less intense beam and should have no effect on measurements of e/m.

In conclusion, the e/m apparatus was subjected to treatment by the "field" generated by the rotary device 1 and it was noticed that the exposure to the field caused a change in the apparatus' performance. As a result of the exposure, the e/m apparatus began giving inaccurate results and became unusable to calculate e/m. Since the e/m apparatus normally gives accurate results, it has been found that its altered results are an indication of the effects produced by the "field" emitted by the rotary device 1.

Test 2 (Performed by the Alter Energy Group):

This test was performed at The Alter Energy Group (TAEG) headquarters. The purpose of the experiment was to study the effect of the field generated by the rotary device 1 application to the function of a power system including an 8 kW gas generator giving power to a 10 HP motor through a 3 phrase converter, wherein the 10 HP motor was coupled to a hydraulic system as load.

Four methods of measuring the power at the output of the phase converter were used: (1) oscilloscopes to measure the current across shunt resistors and phase to phase voltages, including the phase angle between voltage and current; (2) multimeters to measure rms voltages and currents; (3) a power analyzer with clamp on current measuring devices and voltage measuring probes; and (4) an analog power measuring device.

The equipment used in the experiment is herein discussed below. The power equipment included a gas generator (Dayton Model 3W017E, 8000 W, 1 phase, 120.240 V, 3.3 A., 60 Hz, 36,000 rpm, Ser. No. 89441), phase converter (International Electric Phase Co., phase 1–3, 50 A., 1,800 rpm, 230 V, Ser. No. 3682 with 15 HP Buldor motor), three phase motor (Toshiba International Co., 10 HP @ 1,745 rpm, 230/460 V, 26.8/13.4 A, PF: 80.9%, Code H, NEMA B, FR 215J, Model No. B0104LF2US02), and hydraulic pump system (fixed displacement; Sperry-Vickers V-144-10; 37.9 gpm at 1200 rpm).

The testing equipment included two Tecktronic TDS 740 oscilloscopes, a digital power analyzer DPA model #2300, BMI power analyzer, multimeters (Radio Shack Model 22-163), and shunt blocks 50 m,V/200A.

The power generated by the gas generator was sent to a 3 phase motor (Toshiba 10 HP at 1,745 rpm) through a phase converter (International Electric Co.). A hydraulic pump system (Sperry-Vickers V-144-10) served as load to the Toshiba 10 HP motor. This pump was operated at a pressure of 400 psi. All currents were measured through the shunts except for the BMI power analyzer.

The results with the oscilloscopes for the apparent power delivered by the phase converter to the 10 HP motor was around 7.0 kVA (±4%) while the actual power was about 5.3 kW (±8%). The power factor (PF) measured (76%±12%) was within the Toshiba specification for this type of motor which was estimated from a Toshiba Test Report to be about 74.2% at 7.1 HP.

The phase to phase measurements data from the multimeters for the power delivered to the 10 hp motor out of the phase converter showed that the voltages and currents used complied with the apparent power. The apparent power taking, phase 1 or phase 2 as ground, were very similar (around 6.5 kVA±6%). Using phase 3 as a ground gave an apparent power of about 7.5 kVA (±6%). This discrepancy was attributed to the phase angles between the three phases which were not 120 degrees according to the oscilloscopes.

Phase to ground results with the multimeters for the power delivered to the 10 HP motor indicate that the apparent power measured by the multimeters in a phase to ground configuration was around 6.1 kVA±3%. This was similar to the apparent power measured with phase 1 or 2 as ground in the phase to phase measurements. The power delivered to the 10 HP motor measured by the DPA model #2300 was about 3.8 kW, which was much lower than the oscilloscope measurements. This power did not agree with the meters measurements assuming a power factor (PF) of 80.9%. The results with the BMI power analyzer were lower than 1 kW which was much lower than the power measurements accomplished by the other methods. The apparent power delivered to the phase converter by the generator was about 6.3 kVA±2% as measured by the multimeters.

The input horsepower required to generate a certain pressure of the hydraulic fluid is given by:

$$\text{HORSEPOWER INPUT} = \frac{\text{FLOW RATE OUTPUT (gpm)} \times \text{PRESSURE (psi)}}{1714}$$

assuming an overall efficiency of 100%. Using a value of 37.9 gmp (data given by TAEG) at 400 psi, one gets a required power to operate the hydraulic pump at 400 psi of:

8.84 HP or 6,598 W (assuming 1 HP=746 W)

According to the data from the Toshiba Test Report, for 10 HP (7,460 W) delivered by the Toshiba motor, an input power of 8,490 W was needed at a ratio of 87.8%. So to deliver 6,598 W, the Toshiba motor needed 7,510 W at the input. With a PF estimated of 78.6% at 8.84 HP (interpolation of the Toshiba Test Report between 10.00 and 7.49 HP output power), the data of the input power consumption of the Toshiba motor was: apparent power=9,555 VA, power=7,510 W, and reactive power=5,907 VAR. From another experiment (data provided by TAEG), it had been established that the power consumption data of the phase converter was (assuming a PF of 15%): apparent power=2, 000 VA, power=300 W, and reactive power=1,940 VAR.

From the above calculations, the total apparent power the generator needed to generate in order to produce the observed effect was:

$$\sqrt{(7{,}510+330)^2+(5{,}907+1{,}940)^2}=11{,}071 \text{ VA}$$

The apparent power measured by the multimeters was 0.3 KVA. Thus, theoretically the generator should not have been able to drive the system. In fact, the generator powered a system that needed 76% more power than the generator provided.

In summary, the oscilloscopes measurements indicate that the power delivered to the Toshiba motor by the phase converter was about 5.3 kW and that the apparent power was about 7.0 kVA. These results gave a power factor compatible with Toshiba specifications. The multimeters measurements indicated that the apparent power delivered by the generator to the phase converter was about 6.5 kVA for phase to phase measurements and 6.1 kVA for the phase to ground measurements. This was about the same as the apparent power delivered by the generator which was measured to be 6.3 kVA by the multimeters. These measurements indicated a low consumption of power from the phase converter. The DPA model #2300 gave a power delivered by the phase converter of only 3.8 kW which did not agree with the oscilloscopes or the multimeters measurements. The BMI power analyzer gave a power less than 1.0 kW in disagreement with all the other measurements. From theoretical considerations explained above, the generator powered a system that needs 76% more power than the generator provided.

In conclusion, the first result of this experiment was that three out of four different methods of measuring the power coming out of the phase converter to the 10 HP motor did not agree. This result cannot be attributed to equipment malfunction since all equipment had been calibrated by their respective manufacturers a few weeks before being shipped to The Alter Energy Group headquarters (except for the multimeters which had been bought at Radio Shack a few weeks prior to the experiment.) The second result of this experiment was that the generator powered a system that needed about 76% more power than was provided.

Test 3 (Performed by the Department of Navy):

This report test was performed at The Alter Energy Group (TAEG) by the Department of the Navy. The purpose of the experiment was to analyze the effect of the field of the rotary device 1 on a power system made of a new 8 kW gas generator (exposed to the field under the supervision of the Navy staff) giving power to a 10 HP motor through a 3 phase converter, in which the 10 HP motor had a hydraulic system as load.

The methods of measuring the power at the output of the phase converter used clamp on meters to measure the current and a multimeter to measure the voltages. The test utilized a gas generator (Generac Model 09800-1, Series 800 EXL, 800 W, Serial #4239180, 1 phase, 120/240 V, 66.7/33.3 A., 60 Hz, 36,000 rpm), phase converter (Baldor Electric Co., Phase-A-Matic, Phase 1–3, Model #R15, 208–230 V, 42–38 A, 60Hz, 1,800 rpm, Ser. F:1:15), motor (Toshiba International Co., 10 HP @ 1,745 rpm, 230/460 V, 26.8/13.4 A, PF: 80%, Code H, NEMA B, FR 215J, Model No. B0104LF2US02), hydraulic pump system (Fixed displacement; Sperry-Vickers V-144-10; 37.9 gpm at 1200 rpm). For testing equipment, a UEI DM 383 digital multimeter was used for voltage measurements, and a Orlong DL 235 clamp meter (Serial #558550) for current measurements.

The power generated by the gas generator was sent to a 3 phase motor (Toshiba 10 HP at 1,745 rpm) through a phase converter (International Electric Co.). A hydraulic pump system (Sperry-Vickers V-144-10) served as load to the Toshiba 10 HP motor. This pump was operated at a pressure of 400 psi. All currents were measured through the shunts except for the BMI power analyzer. The error on the measurements were not recorded, but from previous experiments they were estimated at about 10%.

The results obtained for the apparent power delivered by the generator to the phase converter for run 1 and run 2, were recorded. The measurements were done at 5 minute intervals. The column labeled load data showed the water pressure setting on the hydraulic pump system. "NL" meant no load connected and consequently the small current observed represented losses in the phase converter. It was seen that the generator generated more apparent power to produce the work (approx. 7.6 or 7.7 kVA) than at the end of the period of constant hydraulic pressure at 440 psi (approx. 7.0 kVA in table 1 and 6.8 kVA in table 3). The results of these two runs were quite similar for 440 psi. The Navy wanted to see the apparent power vs. load change. Data showed that the apparent power started at 6.9 kVA at 440 and went down to 5.3 kVA for 0 psi.

Data was taken that represented the phase to phase measurements data from the clamp on meter for the power delivered to the 10 HP motor out of the phase converter. The differences seen between the phases were noted and explained by the fact that the 3 phases at the output of the phase converter were not at 120 degrees as had been shown in previous experiments. The variation of apparent power was nevertheless less than 10% in general. The power delivered at the beginning of the experiment (6.5 to 6.6 kVA) was greater than at the end of the experiment (6.1 kVA) at a constant load of 440 psi. Again, the two runs show very similar data.

An interesting observation was the minimal change of apparent power with change in load (6.6 to 6.0 kVA) which was a change of about 10%. This was unusual and could be explained using classical physics only if there is much dissipation of power in the hydraulic system making the effect of the pressure secondary.

The input horsepower required to generate a certain pressure of the hydraulic fluid is given by:

$$\text{HORSEPOWER INPUT} = \frac{\text{FLOW RATE OUTPUT (gpm)} \times \text{PRESSURE (psi)}}{1714}$$

assuming an overall efficiency of 100%. Using a value of 37.9 gmp (data given by TAEG) at 440 psi, one gets a required power to operate the hydraulic pump at 400 psi of is calculated at 9.73 HP or 7,258 W (assuming 1 HP=746 W). According to the data from the Toshiba Test Report, for 10 HP (7,460 W) delivered by the Toshiba motor, an input power of 8,490 W is needed for a ratio of 87.8%. So to deliver 7.258 W, the Toshiba motor needs 8,260 W at the input.

With a PF estimated at 78.6% at 8.84 HP (interpolation of the Toshiba Test Report between 10.00 and 7.49 HP output power), the data of the input power consumption of the Toshiba motor was: apparent power=10,509 VA, power=8,260 W, and reactive power=6,497 VAR. From another experiment (data provided by TAEG), it had been established that the power consumption data of the phase converter was (assuming a PF of 15%) apparent power=2,000 VA, power=300 W, and reactive Power: 1,940 VAR.

From the above calculations, the total apparent power the generator needs to generate in order to produce the observed effect is:

$$\sqrt{(8{,}260+300)^2+(6{,}497+1{,}940)^2}=12{,}019 \text{ VA}$$

The apparent power measured by the multimeters was then between 7.7 and 6.8 kVA. It is noted that the generator should not have been able to drive the system. In fact, the generator powered a system that needs between 56%–77% more power than the generator provided. The result of the experiment did not take into account the explanation of the small variation of power with pressure change. This result would have meant a large loss of power dissipated in the hydraulic system and would have required even more apparent power than 12 kVA to work.

In conclusion, the result of this experiment was that the generator powered a system that needed about between 56% and 77% more apparent power than was provided, despite indications of losses in the hydraulic system. These results indicate that the field of the rotary device 1 affected the test apparatus.

EXAMPLE II

The closed-loop hydraulic system 101 shown in FIG. 6 was provided with instrumentation 116 to measure head and downstream pressures of the hydraulic fluid. A series of tests were performed during of which it was determined that the downstream pressure of the hydraulic fluid exceeded the head pressure by amounts ranging from about 28% to about 33%. The hydraulic fluid employed in these test runs was ATF Type A.

For further evaluation of the rotary device 1 under load, a 10-HP electric motor 105 was added to the test apparatus 100 and positioned so that the hydraulic pump 102 could be run either by the rotary device 1 or the electric motor 92. Comparison testing of the rotary device 1 and the electric motor 92 for a series of runs, each for 30 seconds at 600 rpm, resulted in an increase in amount of fluid pumped when the pump 102 was driven by the rotary device 1 from about 28 to 33% over that pumped when the electric motor 105 was the driving force.

After nine months of use in the hydraulic system 108, the hydraulic fluid was analyzed by two independent commercial laboratories. The fluid was shown to be substantially free of contaminants (as compared to 6.5 ppm contaminants in the new, unused fluid). Also, the fluid density had increased whereas its basic weight had decreased. Additionally, the properties of the fluid had changed. In particular, the used fluid was found to weight ½ lb. per gallon less than the new fluid. The used fluid had a much slicker feel than the new fluid.

Gas chromatographic (GC) analyses were run on the new and used fluids by American Technical Laboratories, Inc. (AMTECH) of San Diego, Calif. The results were reported by the Laboratory are herein discussed below.

Samples were diluted 1:1 in carbon disulfide. Injections of 0.5 μl of these solutions were made through heated injection ports. Temperature programming was performed on a non-polar column. The analysis was performed in duplicate. Both samples exhibited a Gausian-like unresolved envelope. The "used" oil showed numerous small peaks superimposed on the envelope, and the center of the enveloped occurred at 19 min. The "new" oil sample had a broader envelope with much less peak definition. Its envelope center occurred at 14 min. The dissimilarity of their GC patterns was best observed by overlaying them. The GC pattern suggested that the samples were from different base oils, however, the data may be mitigated by degradation during use.

Other analyses of the new and used fluid samples were carried out by American Testing Institute (ATI) of San Diego, Calif. The results of these analyses are shown in Table 1, below:

TABLE 1

|  | New Fluid | Used Fluid |
| --- | --- | --- |
| Density | 0.8230 | 0.8398 |
| Viscosity | 40.68 | 41.62 |
| Neutrality Number (MGM/G Oil) | 0.02 | 0.29 |
| Precipitation Number | 0.01 | 0.01 |
| Water Content (% by Weight) | 0.1151 | 0.2390 |
| Contaminants (MGM/100 ml) | 6.5 | 1.1 |
| pH | 6.6 | 7.2 |

The nature of the contaminants in the two hydraulic fluid samples varied considerably. A comparison of these contaminants by particle size distribution follows is shown in Table 2, below:

TABLE 2

| Particle Size (Microns) | New Fluid | Used Fluid |
| --- | --- | --- |
| 5–15 | 250 | 1000 |
| 15–25 | 40 | 600 |
| 25–50 | 15 | 40 |
| 50–100 | 0 | 10 |
| >100 | 0 | 5 |

From the above data, it can be seen that the nine month use of the hydraulic fluid in the test apparatus 100, in particular the closed loop hydraulic system 101, under the above-described conditions brought about changes in the fluid, including a reduction of contaminants to less than 17% of the amount of contaminants in the new fluid; a doubling of the water content of the fluid; and a viscosity increase in proportion to weight; etc.

EXAMPLE III

This example is included to show that metals have been altered by being exposed to the field generated by the rotary device 1.

Novy Metals Lab Inc. of Cypress, Calif. investigated chemical, physical and metallurgical property changes in structures attributed directly to operation of the rotary device 1. In other words, the "structures" investigated were specimens of metals before and after having been exposed to the field produced from the rotary device 1. Novy reported the results of. this investigation which are herein discussed below.

A preliminary review of the laboratory test data indicated that subtle differences in the results of chemical analyses conducted on identical components (representing specimens taken before and after exposure to the field of the rotary device 1) could be attributed to segregation and visible diffusion of elements which were evidenced in the microstructures.

Changes in physical appearance with accompanying dimensional changes were the most obvious anomalies observed in conducting the experiments. Macroscopic examinations indicated the occurrence of plastic material flow (movement) during exposure to the field emitted from the rotary device 1. The resulting redistribution of component mass (distortion) was evidently accompanied by cg (center of gravity) shifts or movement. Magnetic-polarity and gravity tests revealed that these dynamic cg shifts or movements did not become completely static at the completion of a test. They gradually decreased exponentially, and appeared to asymptotically approach their original position held before the exposure began. Therefore, the resulting effects appeared to be accumulative and their residual intensities appeared dependent upon the time allowed for recovery between cycles as well as the number of cycles completed. Accumulation of energy in the rotary device 1 was most-conclusively demonstrated by sporadic discharges of light which appeared to be from discharged photon-energy.

A preliminary review of over one-hundred photomicrographs resulted in numerous observations. Microstructures of specimens which had been subjected to the field of the rotary device 1 exhibited the following: (1) marked evidence of plastic deformation; (2) no evidence of cold work; (3) no evidence of having been subjected to changes by thermal energy (heat); (4) strong evidence of recrystallization; and (5) marked evidence of segregation and/or dispersion of chemical constituents. Moreover, microstructures of some specimens which had been subjected to the field of the rotary device 1 indicated that the recrystallized microstructure was at a lower latent-energy level than the original structure (before exposure to the field).

Based on findings in its investigation, Novy concluded that "the device is a machine which combined with other components, becomes a highly-efficient energy transducer".

EXAMPLE IV

Metallurgical tests were run by American Testing Institute (ATI), San Diego, on brass and copper specimens that had been subjected to the field of the rotary device 1. The results showed that the molecular structure of those metals had changed to a more homogenous grain. None of the metals tested had been subjected to any sort of heat treatment, so the change in molecular structure could not have been attributed to heat.

The bearing assemblies 24, 26 in the rotary device 1 had been installed without lubrication of any kind, and they were never lubricated at any time during the testing of the rotary device 1. After numerous tests, the rotary device 1 was disassembled, the bearing assemblies 24, 26 replaced and the rotary device 1 was reassembled. The old bearing assemblies 24, 26 were sent out for metallurgical testing. Neither the bearing races nor individual ball bearings showed any evidence of friction or heat wear. The individual ball bearings had become denser and changed in shaped from circular to elliptical.

Metallographic prints of grain structures of the pump sprocket 106 (edge and center sections) taken before exposure to the field of the rotary device 1 showed the non-exposed metal grain structure large and random, with carbon lining between the grains. By contrast, the metal that had been exposed to the field had a smaller, less random, more homogenous grain structure, as if it had been heat-treated although, as previously indicated, it had not.

Samples of metal from the hydraulic pump 92 bell housing before and after exposure to the field from the rotary device 1 were subjected to chemical analyses by ATI with the results being shown in Table 3:

TABLE 3

|  | Unexposed Metal (%) | Exposed Metal (%) |
|---|---|---|
| Carbon | 3.13 | 2.53 |
| Manganese | 0.89 | 0.69 |
| Sulphur | 0.051 | 0.129 |
| Phosphorous | 0.034 | 0.078 |
| Silicon | 1.83 | 1.85 |
| Nickel | 0.14 | 0.07 |
| Chromium | 0.29 | 0.44 |
| Molybdenum | 0.29 | ND* |
| Copper | 0.06 | 0.11 |

*Non-detectable

It is noted that the copper content had almost a one hundred percent gain in quantity, the sulphur and phosphorous more than doubled and the molybdenum disappeared, in the exposed sample.

Schedule 80 iron pipe employed in the closed-loop piping system 108 was also tested as to grain structure and chemical makeup, before and after being subjected to the field of the rotary device 1. Metallographic prints of the outer and inner edges of the pipe specimens 108 showed the inside of the exposed pipe 108 to be as smooth like glass as compared to the rough texture of the inside of an unexposed pipe 108 (the normal condition of such pipe).

Following in Table 4 are the results of chemical analyses by ATI of new, unexposed pipe of the type used in the hydraulic fluid system 108 and of the same type of pipe 108 after exposure to the field of the rotary device 1:

TABLE 4

|  | New Pipe (Inside) % | New Pipe (Outside) % | Exposed Pipe (Inside) % | Exposed Pipe (Outside) % |
|---|---|---|---|---|
| Carbon | 0.21 | 0.21 | 0.19 | 0.19 |
| Manganese | .85 | .85 | 0.72 | 0.70 |
| Sulphur | 0.019 | .020 | 0.016 | 0.014 |
| Phosphorous | 0.012 | 0.011 | 0.003 | 0.004 |
| Silicon | .22 | .18 | 0.21 | 0.23 |
| Nickel | .005 | 0.007 | ND | ND |
| Chromium | 0.05 | 0.05 | ND | ND |
| Molybdenum | ND | ND | ND | ND |

ATI also measured the Rockwell B hardness of the four metal samples, with the following results shown in Table 5:

TABLE 5

| New Pipe (Inside) | New Pipe (Outside) | Exposed Pipe (Inside) | Exposed Pipe (Outside) |
|---|---|---|---|
| 83.3 | 74.0 | 53.6 | 64.6 |

From the above data, it is clear that the exposure to the field generated by the operation of the rotary device 1 affected changes in the metallurgic characteristics of the pipe metal such that it had a closer and more homogeneous grain structure, as well as a different chemical make-up and lower Rockwell hardness than it originally had before exposure to the field. All of these changes were imparted to the metal specimens without any heat treatment of the metal.

The results of tests on various other metal specimens that have been exposed to the field of the rotary device 1 are herein also disclosed. Comparative chemical analyses were performed by ATI of 6061 aluminum which composed two flat sidewalls 82 of the housing of the rotary device 1 before and after exposure to the field. The exposure produced the following results shown in Table 6:

TABLE 6

|  | Exposed Aluminum | New Aluminum |
|---|---|---|
| Carbon | 0.07 | 0.07 |
| Silicon | 0.66 | 0.63 |
| Chromium | 0.29 | 0.17 |
| Copper | 0.28 | 0.29 |
| Titanium | .022 | 0.022 |
| Magnesium | 0.99 | 0.96 |
| Aluminum | Remainder | Remainder |
| Iron | 0.36 | 0.65 |
| Zinc | 0.05 | 0.05 |

Chemical analysis by ATI of leaded bronze state plates from the hydraulic pump 102, before and after use in the hydraulic fluid system 101 described above, herein follows. It is noted that the analytical data more than showed a 250% increase in zinc, almost a 60% decrease in both nickel and antimony, and almost a 67% decrease in phosphorous in the exposed alloy, as compared with its unexposed counterpart. Additionally, the analysis showed an increase in tin and decrease in copper in the exposed metal. The following results are tabulated in Table 7, below:

TABLE 7

|  | Exposed Leaded Bronze Alloy (%) | Unexposed Leaded Bronze Alloy (%) |
|---|---|---|
| Phosphorous | .004 | .011 |
| Nickel | 0.23 | 0.55 |
| Copper | 86.71 | 88.32 |
| Aluminum | ND | ND |
| Tin | 9.85 | 9.33 |
| Lead | 1.62 | 1.28 |
| Iron | 0.018 | 0.020 |
| Zinc | 0.74 | 0.21 |
| Antimony | 0.07 | 0.16 |

A brass specimen ¼ of an inch thick was exposed to the field from the rotary device 1. As a result, it was not only hardened, but two different hardnesses were measured on each side of the specimen. Other specimens, of copper and brass, were exposed to the field of the rotary device 1. Chemical analyses by ATI of the unexposed and exposed samples appear below in Table 8:

TABLE 8

|  | Unexposed Copper (%) | Exposed Copper (%) | Unexposed Brass (%) | Exposed Brass (%) |
|---|---|---|---|---|
| Copper | 99.46 | 99.55 | 71.00 | 68.85 |
| Tin | ND | ND | ND | ND |
| Lead | ND | ND | 0.010 | 0.015 |
| Iron | 0.005 | 0.006 | 0.048 | 0.046 |
| Zinc | ND | ND | 28.07 | 30.96 |

From the above data, it appears that the content of the copper was increased by exposure to the field of the device 1, whereas the copper in the brass sample was decreased by such exposure.

A sintered bronze bearing 24 that had not been heat-treated to increase its Rockwell hardness (the conventional way of hardening such a bearing) was subjected to chemical analysis and evaluated for Rockwell hardness before and after being exposed to the field of the rotary device 1 for 5 minutes. The results are tabulated in Table 9 below:

TABLE 9

|  | Bronze Bearing Prior to Exposure | Bronze Bearing After Exposure |
| --- | --- | --- |
| Copper | 89.54% | 90.10% |
| Tin | 9.28 | 8.72 |
| Lead | 0.004 | 0.002 |
| Iron | 0.05 | 0.055 |
| Zinc | 0.10 | 0.08 |
| Nickel | 0.005 | 0.003 |
| Aluminum | 0.001 | 0.001 |
| Carbon | 0.98 | 1.01 |
| Phosphorous | 0.025 | 0.030 |

The average hardness of the unexposed bearing was found to be R/H 55.0, and of the exposed bearing, R/H 73.0.

In conclusion, all the results from aforementioned ATI testing show changes in the metal specimens as a result of their exposure to field generated from rotary device 1. Each of the metals tested has shown one or more of the following changes: (1) denser crystalline structure; (2) excellent layering of grain structure; (3) increase in yield strength; (4) increase in tensile strength; (4) improved ductility; (5) increased elongation; (6) increase in Rockwell hardness; (7) change in element intensity; (8) decrease in weight; and (9) resistance to rust.

EXAMPLE V

Additional metallurgic testing was performed at Atlas Testing Laboratories, Inc. of Los Angeles, Calif. examined samples of metals from parts of the hydraulic pump 102 and the sprocket drive 106 for the pump and performed a variety of tests on the samples.

For instance, one investigation involved a piece of 6061 aluminum that was cut from a base support stand 80 for the rotary device 1 that had been subjected to the field from the operating rotary device 1. Heat was applied to the aluminum for several minutes then immediately taken away. The aluminum was found to be cold to the touch. The aluminum material showed that its iron content had increased significantly, its chromium content had increased significantly and the atomic structure of the aluminum had changed.

To illustrate the repeatability of the effect of the field of the rotary device 1 on metals, a series of lab tests of the mechanical properties of exposed aluminum specimens was carried out by ATL. Both chemical analysis and mechanical testing were performed on the specimens. The chemical analyses showed variation in chemical content as a result of exposure to the aforesaid field, but those results are not included because such variation has been amply demonstrated by results previously reported herein. The results of the mechanical tests are tabulated in Table 10, below:

TABLE 10

|  | A356 Aluminum | | A356 Aluminum T6 | |
| --- | --- | --- | --- | --- |
|  | As Cast | Exposed | As Cast | Exposed |
| Yield Strength | | | | |
| Actual Load in Lbs. | 2,380 | 2,480 | 5,580 | 5,680 |
| psi | 11,800 | 12,100 | 27,500 | 28,100 |
| Tensile Strength | | | | |
| Actual Load in Lbs. | 5,400 | 5,760 | 8,140 | 8,300 |
| psi | 26,700 | 28,100 | 40,100 | 41,100 |
| Elongation in 2" | .12 | .16 | .19 | .19 |
| Elongation (%) | 6.0 | 8.0 | 9.5 | 9.5 |

The test results on the A356 aluminum show increased yield strength and tensile strength and greater elongation as a result of exposure to the field of the rotary device 1. Thus the exposure resulted in a metal of greater impact resistance and strength than it had before the exposure, yet the material was more ductile than before and that could therefore be worked or formed more easily, with a reduced possibility of fracturing, then its unexposed counterpart. As to the A356 aluminum T6 sample, exposure also increased the yield strength and tensile strength of that material and resulted in a harder metal with greater impact resistance and strength than its unexposed counterpart, yet the material was still as malleable as the latter.

The present invention can exist in forms other than the preferred prototype shown in the attached drawing, each of which is considered to be within the scope of the invention so long as it falls within the reach of the language of any of the following claims. Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. A gas-jet driven rotary device comprising:

a rotor having a hub shaft and means adapted to support said rotor for rotation about the axis of said hub shaft;

said rotor comprising structure defining a fluid passageway extending from an inlet opening in one end of said hub shaft to a first bend intermediate the ends of the shaft, then through said first bend and substantially radially outwardly from the shaft to a second bend with an exit opening leading to an orbital path around the axis of said shaft, then through said second bend and part way around said orbital path to a third bend, then through said third bend and radially inwardly toward said shaft to a fourth bend, then through said fourth bend and along a longitudinal pathway within said shaft and out that end of the shaft opposite the end with said inlet opening to a fifth bend, then through the fifth bend and substantially radially outwardly from an axial extension of said shaft to a sixth bend, then through said sixth bend to an outlet opening facing a direction substantially tangential to an orbit thereof around said axial extension;

said structure having a metallic band snugly encircling that part thereof defining said orbital path to add mass to said rotor;

said rotor being adapted to spin around the axis of its hub shaft when a pressurized gas is introduced into said fluid passageway through said inlet opening and exhausts therefrom through said outlet opening as a jet, the direction of spin being opposite to the direction of gas flow in the jet in reaction to the thrust of said jet.

2. The gas-jet driven rotary device in accordance with claim 1 including a housing for enclosing a major portion of said rotor having a pair of walls in which opposite ends of said hub shaft are rotatably supported.

3. The gas-jet driven rotary device in accordance with claim 2 in which said housing is adapted to be hermetically sealed against gas leakage.

4. The gas-jet driven rotary device in accordance with claim 3 in which said housing has a cylindrical wall interposed between and separating said pair of walls.

5. The gas-jet driven rotary device in accordance with claim 4 in which said outlet opening faces in a rotational direction about the axis of spin of said rotor opposite to the rotational direction in which the opening from said second bend into said orbital path face.

6. The gas-jet driven rotary device in accordance with claim 5 in which that part of said structure defining said fluid passageway that forms said orbital path around the axis of said hub shaft comprises tubular means.

7. The gas-jet driven rotary device in accordance with claim 6 in which said tubular means comprises a rigid outer tube and a flexible inner tube, the latter being of smaller diameter than, and supported in generally concentrically spaced disposition within, the former, the flexible inner tube forming the orbital path portion of said fluid passageway.

8. The gas-jet driven rotary device in accordance with claim 7 in which said tubular means is partially supported in position by means of a plurality of spoke elements interconnecting it with said hub shaft.

9. The gas-jet driven rotary device in accordance with claim 8 in which at least one of said spoke elements has a hollow interior and comprises that part of the fluid passageway structure between said first bend and said second bend.

10. The gas-jet driven rotary device according to claim 3, wherein said ball bearing assemblies are purposely fitted to induce a wobble into said rotor when said rotor spins about the axis of said hub shaft.

11. The gas-jet driven rotary device according to claim 1, further comprising base stand for supporting said gas-jet driven rotary device above a floor.

12. The gas-jet driven rotary device according to claim 11, further comprising a pair of sidewall panels forming a partial enclosure around two contiguous sides of four vertical sides defined by said gas-jet driven rotary device and said base supporting stand.

13. The gas-jet driven rotary device according to claim 12, wherein when said rotor is driven by the gas-jet, the exhausted jet ricochets off from said pair of sidewall panels during each revolution of the rotor.

14. The gas-jet driven rotary device according to claim 13, wherein the ricochet induces a wobble into said rotor when said rotor spins about the axis of said hub shaft.

15. The gas-jet driven rotary device according to claim 1, wherein said hub shaft is rotatably supported within said pair of walls by ball bearing assemblies.

16. A gas-jet driven rotary device for generating a field and process for exposing at least one of mechanical, electrical, and chemical system, device, or component to the field generated by said gas-jet driven rotary device:

the device comprising:

a rotor having a hub shaft and means adapted to support said rotor for rotation about the axis of said hub shaft;

said rotor comprising structure defining a fluid passageway extending from an inlet opening in one end of said hub shaft to a first bend intermediate the ends of the shaft, then through said first bend and substantially radially outwardly from the shaft to a second bend with an exit opening leading to an orbital path around the axis of said shaft, then through said second bend and part way around said orbital path to a third bend, then through said third bend and radially inwardly toward said shaft to a fourth bend, then through said fourth bend and along a longitudinal pathway within said shaft and out that end of the shaft opposite the end with said inlet opening to a fifth bend, then through the fifth bend and substantially radially outwardly from an axial extension of said shaft to a sixth bend, then through said sixth bend to an outlet opening facing a direction substantially tangential to an orbit thereof around said axial extension;

said structure having a metallic band snugly encircling that part thereof defining said orbital path to add mass to said rotor;

said rotor being adapted to spin around the axis of its hub shaft when a pressurized gas is introduced into said fluid passageway through said inlet opening and exhausts therefrom through said outlet opening as a jet, the direction of spin being opposite to the direction of gas flow in the jet in reaction to the thrust of said jet; and a housing for the major portion of said rotor having a pair of walls in which opposite ends of said hub shaft are rotatably supported, said housing having a cylindrical wall interposed between and separating said pair of walls, said housing adapted to be hermetically sealed against gas leakage;

the process including:

positioning the at least one of mechanical, electrical, and chemical system, device, or component within close proximity to said the gas-jet rotary device when said device is being operated; and exposing the at least one of mechanical, electrical, and chemical system or component to the field generated by the device.

17. The process according to claim 16, wherein said outlet opening faces in a rotational direction about the axis of spin of said rotor opposite to the rotational direction in which the opening from said second bend into said orbital path face.

18. The process according to claim 17, that part of said structure defining said fluid passageway that forms said orbital path around the axis of said hub shaft comprises tubular means.

19. The process according to claim 18 in which said tubular means comprises a rigid outer tube and a flexible inner tube, the latter being of smaller diameter than, and supported in generally concentrically spaced disposition within, the former, the flexible inner tube forming the orbital path portion of said fluid passageway.

20. The process according to claim 19 in which said tubular means is partially supported in position by means of a plurality of spoke elements interconnecting it with said hub shaft, wherein at least one of said spoke elements has a hollow interior and comprises that part of the fluid passageway structure between said first bend and said second bend.

21. The process according to claim 16, wherein the rotary device further comprises a base stand for supporting said gas-jet driven rotary device above a floor.

22. The process according to claim 21, wherein the gas-jet driven rotary device and the base stand further comprising a pair of sidewall panels forming a partial enclosure around two contiguous sides of four vertical sides defined by said gas-jet driven rotary device and said base supporting stand.

23. The process according to claim 22, wherein when said rotor is driven by the gas-jet, the exhausted jet ricochets off from said pair of sidewall panels during each revolution of the rotor.

24. The process according to claim 23, wherein the ricochet induces a wobble into said rotor when said rotor spins about the axis of said hub shaft.

25. The process according to claim 16, wherein said hub shaft is rotatably supported within said pair of walls by ball bearing assemblies.

26. The process according to claim 25, wherein said ball bearing assemblies are purposely fitted to induce a wobble into said rotor when said rotor spins about the axis of said hub shaft.

27. A gas-jet driven device comprising:
a rotor comprising,
    a hub adapted to rotate about a center axis;
    a jacketed wheel concentrically surrounding said hub and connected to said hub by a jacketed radial section, and having a radially inclined arm attached to a bottom end of said hub, said wheel supported by a plurality of tubular radial spokes; and
    a gas conduit having an inlet and exhaust outlet, said conduit defined by a first section routed through a first upper vertical section of said hub, a second section routed through one of said plurality of spokes, a third section routed through a lower internal annular section of said hub, and a fourth section routed through said radial arm an terminating at said exhaust outlet; and
a housing comprising an upper wall, a lower wall, and cylindrical wall positioned between said upper wall and lower wall and centered about the center axis, adapted to support said hub in a vertical orientation about the center axis and to substantially enclose and support said hub and said jacketed wheel in a horizontally orientation;
wherein said rotor is driven about the center axis by flowing pressurized gas through said inlet such that a jet is formed at said exhaust outlet,
wherein said hub is mounted to said upper and said lower walls by bearings having a fitment which causes said rotor to wobble when said rotor is driven.

28. A gas-jet driven device comprising:
a rotor comprising,
    a hub adapted to rotate about a center axis;
    a jacketed wheel concentrically surrounding said hub and connected to said hub by a jacketed radial section, and having a radially inclined arm attached to a bottom end of said hub, said wheel supported by a plurality of tubular radial spokes; and
    a gas conduit having an inlet and exhaust outlet, said conduit defined by a first section routed through a first upper vertical section of said hub, a second section routed through one of said plurality of spokes, a third section routed through a lower internal annular section of said hub, and a fourth section routed through said radial arm an terminating at said exhaust outlet;
a housing adapted to support said hub in a vertical orientation about the center axis and to substantially enclose and support said hub and said jacketed wheel in a horizontally orientation; and
a base stand having a square footprint with four vertical sides for supporting said rotor above a floor and a pair of sidewall panels forming a partial enclosure around two contiguous sides said four vertical sides;
wherein said rotor is driven about the center axis by flowing pressurized gas through said inlet such that a jet is formed at said exhaust outlet.

29. The gas-jet driven device according to claim 28, wherein when said rotor is driven by the pressurized gas, the exhausted jet ricochets off from said pair of sidewall panels during each revolution inducing wobble into said rotor when said rotor spins about the center axis.

* * * * *